US006312514B1

United States Patent
Schulte et al.

(10) Patent No.: US 6,312,514 B1
(45) Date of Patent: Nov. 6, 2001

(54) USE OF DIOL ALKOXYLATES AS ADDITIVES FOR THE PRODUCTION OF PIGMENT CONCENTRATES

(75) Inventors: Heinz-Guenther Schulte, Muelheim; Rainer Hoefer, Duesseldorf; Hans-Christian Raths; Harald Frommelius, both of Monheim; Stefan Gollnick, Neuss, all of (DE)

(73) Assignee: Cognis Deutschland GmbH, Duesseldorf (DE)

( * ) Notice: Subject to any disclaimer, the term of this patent is extended or adjusted under 35 U.S.C. 154(b) by 0 days.

(21) Appl. No.: 09/530,840

(22) PCT Filed: Oct. 24, 1998

(86) PCT No.: PCT/EP98/06766

§ 371 Date: Aug. 31, 2000

§ 102(e) Date: Aug. 31, 2000

(87) PCT Pub. No.: WO99/23184

PCT Pub. Date: May 14, 1999

(30) Foreign Application Priority Data

Nov. 4, 1997 (DE) .............................. 197 48 576

(51) Int. Cl.⁷ ........................... C09D 17/00; C09B 67/00
(52) U.S. Cl. ...................... 106/499; 106/413; 106/460; 106/476; 106/493; 106/497; 106/504
(58) Field of Search .................... 106/413, 460, 106/476, 493, 497, 499, 504

(56) References Cited

U.S. PATENT DOCUMENTS

| 4,117,249 | 9/1978 | De Simone et al. | 568/855 |
|---|---|---|---|
| 5,336,313 | 8/1994 | Bunte et al. | 106/504 |
| 5,634,971 | 6/1997 | Baker | 106/499 |
| 5,855,662 | 1/1999 | Brand et al. | 106/498 |

FOREIGN PATENT DOCUMENTS

| 26 28 145 A1 | 12/1976 | (DE) . |
| 39 20 130 A1 | 1/1991 | (DE) . |
| 0 011 752 A1 | 6/1980 | (EP) . |
| 0 032 188 A1 | 7/1981 | (EP) . |
| 0 585 571 A1 | 3/1994 | (EP) . |
| 0 735 109 A2 | 10/1996 | (EP) . |
| 0 565 709 B1 | 11/1996 | (EP) . |
| 861223 | 2/1961 | (GB) . |
| WO96/07689 | 3/1996 | (WO) . |

OTHER PUBLICATIONS

H. Kittel, Lehrbuch Der Lacke Und Beschichtungen, vol. III, Verlag W.A. Columb, Berlin, Oberschwanda, (1976), pp. 239–259 (no month).

Robinson, et al., "Dispersants", Paper Coating Additives, Monograph No. 25, TAPPI, Atlanta, (1963), pp. 41–69 (no month).

J.D. Schofield, "Polymeric Dispersants", Handbook of Coatings Additives, L.J. Calbo (Ed.), vol. 2, Marcel Dekker, New York, Basel, Hong Kong, (1992), pp. 71–104 (no month).

Baumann, et al., "Stabilisierungssysteme für die Herstellung von Polymer–Dispersionen" [Stabilizing Systems for Preparing Polymer Dispersions], Welt der Farben, (Feb., 1996), pp. 15–21.

Otto–Albrecht Neumüller, Römpps Chemie–Lexikon, 7th Ed., Stuttgart, 1974, pp. 2693–2695 (no month).

*Primary Examiner*—Anthony Green
(74) *Attorney, Agent, or Firm*—John E. Drach; Aaron R. Ettelman

(57) ABSTRACT

Pigment concentrates comprising a pigment, a liquid carrier medium and a diol alkoxylate of the general formulae (I), (II) and/or (III) are described in conjunction with methods of preparing the same. The diol alkoxylates described and used herein are of the general formulae (I), (II) and/or (III):

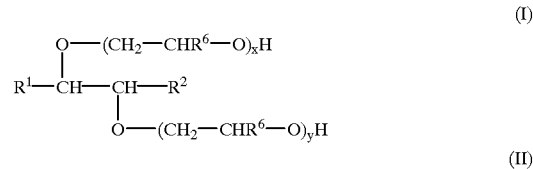

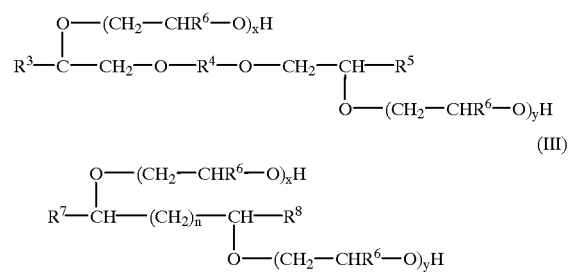

wherein each of $R^1$, $R^2$, $R^3$, $R^5$, $R^7$ and $R^8$ independently represents a hydrogen atom or an alkyl group having from 1 to about 36 carbon atoms, with the proviso that both $R^1$ and $R^2$ are not simultaneously hydrogen atoms and the total number of carbon atoms in $R^1$ and $R^2$ is from about 6 to about 38, and with the proviso that both $R^3$ and $R^5$ are not simultaneously hydrogen atoms and the total number of carbon atoms in $R^3$ and $R^5$ is from about 6 to about 38, wherein $R^4$ represents a linear or branched alkylene group having from about 2 to about 12 carbon atoms or $(-CH_2-CHR^6-O)_z-$, wherein $R^6$ represents a hydrogen atom or a methyl group, wherein each of x and y independently represent a number of from about 1 to about 200, z represents a number of from about 1 to about 20, n represents a number of from about 2 to about 12, and wherein the sum of x+y is a number of from about 5 to about 200.

20 Claims, No Drawings

USE OF DIOL ALKOXYLATES AS ADDITIVES FOR THE PRODUCTION OF PIGMENT CONCENTRATES

BACKGROUND OF THE INVENTION

Pigment concentrates are prepared by breaking down pigments with the aid of shear machines in a liquid carrier medium and dispersing them so finely that the pigment is permanently in the form of the primary particles. Suitable shear machines are known to the skilled worker and are described with particular attention to American technologies in, for example C.H. Hare, Protective Coatings—Fundamentals of Chemistry and Composition, Technology Publishing Comp., Pittsburg (1994).

Owing to the importance of dispersing for the varnish, paint and printing ink industry, both the dispersing process and the low and higher molecular mass compounds suitable for stabilizing the primary particles are described at length in the technical literature. By way of example, reference may be made here to:

H. Kittel, Lehrbuch der Lacke und Beschichtungen, Vol. III, p. 239 ff., Verl. W. A. Colomb, Berlin, Oberschwandorf (1976)

J.V. Robinson, R. N. Thompson, Dispersants, in Paper Coating Additives, Monograph No. 25, TAPPI, Atlanta 1963

J. D. Schofield, Polymeric Dispersants, in Handbook of Co a ting Additives, L. J. Calbo (Ed.) Vol. 2, Marcel Dekker, New York, Basel, Hong Kong (1992).

From the known prior art it is not possible to derive any teaching relating to the targeted selection of additives which effectively support the formulation of pigment concentrates, especially when these pigment concentrates are intended to allow the preparation of low-emissions or emissions-free paints and printing inks or when they are to be free from environmentally or ecotoxicologically unacceptable substances.

A particular difficulty is represented by the formulation of aqueous pigment concentrates, especially when these concentrates are to be formulated without the addition of low molecular mass cosolvents such as ethylene glycol or propylene glycol. Thus, as the skilled worker is aware, so-called pigment dispersants based on polyphosphates or polyacrylates, although outstandingly suitable for maintaining pigments and fillers in suspension alongside the emulsifier-stabilized or protective-colloid-stabilized latex particles in emulsion paints, are unsuitable for preparing pigment concentrates having the profile of requirements described above.

The majority of dispersants, which are of outstanding suitability in organic carrier oils of different polarities, fail if water is chosen as the continuous phase for the pigment concentrates. Surfactant-type dispersants which provide good pigment wetting, such as alkylphenol polyglycol ethers—see, for instance, patent GB 861 223—in turn have come under environmental debate in recent times in respect of their biodegradability, both in the laundry detergent and cleaning products industries, where they have already been fully replaced as surfactants in Germany, and in emulsion polymerization, i.e., in the production of aqueous binders for emulsion paints; in this context see:

C. Baumann, D. Feustel, U. Held, R. Höfer, "Stabilisierungssysteme für die Herstellung von Polymer-Dispersionen" [Stabilizing Systems for Preparing Polymer Dispersions] in: Welt der Farben, p. 15ff., (2/1996).

A further difficulty in respect of selecting additives to formulate pigment concentrates is that the dispersing additive must be selected such that, substantially independently of the carrier oil, the viscosity of the continuous phase decreases as the shear force increases; i.e., the dispersion must possess pseudoplasticity and must in no case be dilatant.

When formulating pigment concentrates care must further be taken to establish a special balance between water retention capacity and hygroscopy such that the intrinsic drying of the concentrate is greatly retarded. Partially dried pigment concentrates should be readily redispersible. On the other hand, water retention capacity and hygroscopy must not be so high that the finished coating becomes sensitive to water.

Other service properties of the finished paint as well, such as freeze/thaw stability, storage stability, and shear stability, must not be adversely affected, with the same applying to properties of the cured film, e.g., clarity, gloss, or resistance to blushing.

A further particular requirement to be met by the pigment concentrates to be developed in accordance with the invention is that there must be compatibility with a broad spectrum of binders, organic and inorganic pigments, which in turn are usually present dispersed in what are known as base coats, and at the same time both with water and with the different solvents used in paints, and also with the highly alkaline waterglasses used in silicate paints.

A high percentage of liquid paints are produced industrially by preparing the polymeric binder in a separate stage and then blending it with the other ingredients to form the finished paint. If coloration is to take place at this point rather than later, the pigment is dispersed with the binder in an upstream stage in a high-speed mixer or in a dissolver, and is then diluted down to use concentration. Of particular interest in connection with this invention are architectural paints for home improvement use and for the craft sector, both for interior and exterior coatings. The binders for these paints are prepared by emulsion polymerization in aqueous phase. In practice, the aqueous phase frequently comprises volatile organic solvents, known as coalescents, which are added either during the polymerization or later and which assist in film formation by partially dissolving the latex particles and also promote leveling. The inherent odor of these coalescents, especially that of the known and widespread 2,2,4-trimethyl-3-hydroxypentyl isobutyrate (Texanol®), can be perceived for several days in freshly painted rooms. In modern-day society, however, this odor is increasingly found to be a nuisance. There is therefore interest in keeping modern paints totally free from such coalescents and other volatile solvents or cosolvents and in also not introducing such ingredients via the pigment concentrates either.

Besides the coloring of paints during production, a significant percentage are not colored until immediately before their use, whether in order to establish special shades or for the purpose of meeting particular customer wishes. In these cases, an industrially premanufactured pigment concentrate is admixed to a white or pastel stock paint. This near customer form of color adjustment can be done either by tradespersons or on a semi-industrial or industrial basis. In these cases the pigment concentrate is usually admixed in a proportion of from 5 to 200 ml per l of stock paint. Often, a combination of two or three different pigment pastes is required in order to arrive at the desired shade. The pigment concentrates commonly comprise high pigment concentrations; i.e., the pigment volume concentration—abbreviated to pvc—is normally between 10 and 80%.

DE-A-26 28 145 discloses adducts of ethylene oxide on specific glycols, containing a —C≡C— group as structural element. These compounds are said to be suitable as moisteners, dispersants, nonionic antifoams, and viscosity stabilizers, and to develop their action in aqueous solution at a lower concentration than in the case of conventional surfactants. Other than listing the abovementioned areas of application, however, DE-A-26 28 145 does not disclose any specific further details or exemplary embodiments.

EP 565 709 B1 discloses aqueous inkjet inks which include polyol-alkylene oxide condensates as a cosolvent. According to page 4, lines 9–15 of this document, the polyol contains in particular three or more OH groups. There is explicit mention of specific triols such as glycerol, trimethylolpropane, trimethylolethane, 1,2,4-butanetriol, and 1,2,6-hexanetriol, and also of pentaerythritol and di(trimethylolpropane) as tetrols, glucose as a pentol, and sorbitol and inositol as hexols. The use of diols, however, is said to be fairly unsatisfactory. It is found in this context that alkylene oxide condensates of diols are generally not compatible with pigment dispersions, with the possible exception of neopentyl glycol alkoxylates.

WO 96/7689 discloses copolymers of the general formula (A—COO)$_2$—B, in which A has a molar weight of at least 500 and is the residue of an oil-soluble complex monocarboxylic acid of specific structure and B has a molar weight of at least 500 and is the divalent radical of an alkyl glycol or of a polyalkylene glycol. The copolymers of WO 96/7689 are said to be suitable for dispersing inorganic pigments in organic media.

EP 735 109 A2 discloses aqueous pigment preparations containing inter alia from 10 to 80% of a pigment and from 0.1 to 20% of an alkoxylation product obtained by adding optionally substituted styrenes onto optionally substituted phenols and reacting the adducts with ethylene oxide and/or propylene oxide.

DE 39 20 130 A1 discloses the use of partial esters of oligoglycerols with fatty acids as pigment dispersants for aqueous paint dispersions. Said partial esters can if desired have been ethoxylated and/or propoxylated.

The present invention was based on the object of providing effective additives for preparing pigment concentrates, and the pigment concentrates thereby obtainable themselves, which meet the large number of abovementioned criteria relating to the desirable profile of properties of such additives and, respectively, of the pigment concentrates themselves.

BRIEF SUMMARY OF THE INVENTION

The present invention includes the use of diol alkoxylates of the general formulae (I), (II) and (III) in the preparation of pigment concentrates, and includes methods or preparing the same. The present invention also includes pigment concentrates comprising a pigment, a diol alkoxylate of the general formulae (I), (II) and/or (III), and a liquid carrier medium. Pigment concentrates of the present invention are preferably aqueous, and thus, the preferred liquid carrier medium is water.

The invention provides first of all for the use of diol alkoxylates as additives for preparing pigment concentrates. Said diol alkoxylates are selected from the group of compounds of the formulae (I) to (III).

The compounds (I) to (III) have the following structures:

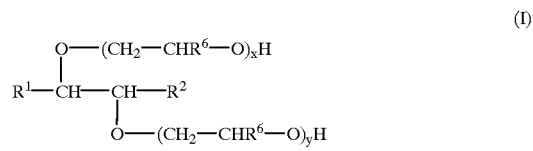

(I)

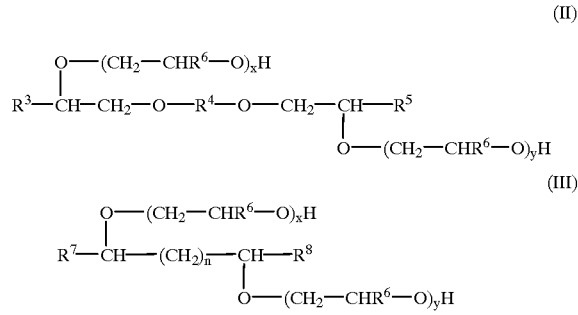

(II)

(III)

in which
the radicals $R^1$ and $R^2$ independently of one another are alkyl groups having 1 to 36 carbon atoms or hydrogen,
the radicals $R^3$ and $R^5$ independently of one another are alkyl groups having 1 to 36 carbon atoms or hydrogen,
the radical $R^4$ is a straight-chain or branched alkylene group having 2 to 12 carbon atoms or a group (—CH$_2$—CHR$^6$—O)$_z$,
the radical $R^6$ is hydrogen or a methyl group,
the radicals $R^7$ and $R^8$ independently of one another are alkyl groups having 1 to 36 carbon atoms or hydrogen,
the indices x and y independently of one another are numbers in the range from 1 to 200,
the index z is a number in the range from 1 to 20, and
the index n is a number in the range from 2 to 12,
with the further proviso that
radicals $R^1$ and $R^2$ must not both simultaneously be hydrogen,
the sum of the carbon atoms in the radicals $R^1$ and $R^2$ is in the range from 6 to 38,
radicals $R^3$ and $R^5$ must not both simultaneously be hydrogen,
the sum of the carbon atoms in the radicals $R^3$ and $R^5$ is in the range from 6 to 38,
the sum (x+y) is a number in the range from 5 to 200.

For preferred embodiments, in the compounds of the formulae (I) to (III), independently of one another
the radicals $R^1$ and $R^2$ and, respectively, $R^3$ and R5 are alkyl groups having 12 to 18 carbon atoms, and
the sum (x+y) is a number in the range from 5 to 120.

In one preferred embodiment the present invention provides for the use of the diol alkoxylates (I) to (III) as additives for preparing aqueous pigment concentrates.

The amount of diol alkoxylates to be used in accordance with the invention depends firstly on the nature of the colorants to be dispersed and also on the amount of the colorants to be dispersed. The compounds (I), (II) and (III) are preferably used in an amount of from 0.1 to 20% by weight, based on the overall pigment dispersion.

DETAILED DESCRIPTION OF THE INVENTION

The compounds (I) to (III) can be prepared by any methods known to the skilled worker from the literature. As a general rule, a diol is prepared first of all and is then alkoxylated by customary methods. The standard method of alkoxylation is to contact an alcohol—in the case of the present invention a diol—with ethylene oxide and/or propylene oxide and to react this mixture in the presence of an alkaline catalyst at temperatures in the range from 20 to 200° C. In this way, adducts of ethylene oxide (EO) and/or propylene oxide (PO) with the respective diol used are obtained. The adducts therefore include EO adducts or PO adducts or EO/PO adducts with the particular diol used; in the case of the EO/PO adducts, the addition of EO and PO can take place randomly or clockwise.

Representative Examples of the Preparation of Compounds (I)

Reaction of relatively long-chain epoxides, obtainable by known processes from olefins of a wide variety of origins by epoxidation, with ethylene glycol in a molar ratio of 1:1 in the presence of alkaline or acidic catalysts, and subsequent ethoxylation of the resultant products.

For example, an α-olefin epoxide having 14 carbon atoms is reacted with ethylene glycol in a molar ratio of 1:1. Subsequently, the desired amount of ethylene oxide and/or propylene oxide is added onto the resultant diol.

Representative Examples of the Preparation of Compounds (II)

Reaction of relatively long-chain epoxides, obtainable by known processes from olefins of a wide variety of origins by epoxidation, with ethylene glycol in a molar ratio of 2:1 in the presence of alkaline or acidic catalysts, and subsequent ethoxylation of the resultant products.

For example, an α-olefin epoxide having 16 carbon atoms is reacted with ethylene glycol in a molar ratio of 2:1. Subsequently, the desired amount of ethylene oxide and/or propylene oxide—for example, 10 mol of ethylene oxide per mole of the diol—is added onto the resultant diol.

Representative Examples of the Preparation of Compounds (III)

12-Hydroxystearyl alcohol is obtainable by hydrogenating methyl ricinoleate. This diol can be ethoxylated to give compounds of type (III). Further compounds of type (III) are obtained by alkoxylating α,ω-alkanediols, such as 1,10-decanediol or 1,12-dodecanediol.

The compounds (I) to (III) present in the pigment concentrates of the invention are nitrogen-free and free from hydrolyzable ester or aldehyde groups.

The present invention further provides pigment concentrates comprising a) from 10 to 80% by weight of one or more pigments,
b) from 0.1 to 20% by weight of one or more diol alkoxylates from the group of compounds of the formulae (I) to (III)

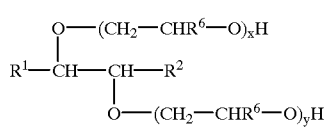

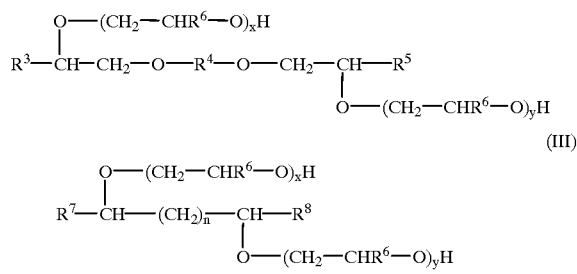

in which
the radicals $R^1$ and $R^2$ independently of one another are alkyl groups having 1 to 36 carbon atoms or hydrogen,
the radicals $R^3$ and $R^s$ independently of one another are alkyl groups having 1 to 36 carbon atoms or hydrogen,
the radical $R^4$ is a straight-chain or branched alkylene group having 2 to 12 carbon atoms or a group $(-CH_2-CHR^6-O)_z-$,
the radical $R^6$ is hydrogen or a methyl group,
the radicals $R^7$ and $R^8$ independently of one another are alkyl groups having 1 to 36 carbon atoms or hydrogen,
the indices x and y independently of one another are numbers in the range from 1 to 200,
the index z is a number in the range from 1 to 20, and
the index n is a number in the range from 2 to 12,
with the further proviso that
radicals $R^1$ and $R^2$ must not both simultaneously be hydrogen,
the sum of the carbon atoms in the radicals $R^1$ and $R^2$ is in the range from 6 to 38,
radicals $R^3$ and $R^5$ must not both simultaneously be hydrogen,
the sum of the carbon atoms in the radicals $R^3$ and $R^5$ is in the range from 6 to 38,
the sum (x+y) is a number in the range from 5 to 200, and c) from 15 to 85% by weight of a liquid carrier medium.

As far as the selection of the pigments a) is concerned, there are no restrictions per se whatsoever in the context of the present invention. As is known to the skilled worker, pigments comprise particulate organic or inorganic substances which are virtually insoluble in solvents or binders and which may either be color-imparting themselves or flatting. Many inorganic pigments also function as fillers, and vice versa. Examples of particularly widespread classes of pigments can be found in the relevant technical literature, for instance:

Otto-Albrecht Neumüller, Römpps Chemie-Lexikon, 7th edition, Stuttgart 1974, pages 2693–2695

Liquid carrier media c)—for instance, organic carrier oils or water—are known to the skilled worker. In one preferred embodiment the liquid carrier medium chosen is water. In this case, therefore, the pigment concentrates are aqueous.

In another embodiment, the pigment concentrates of the invention contain not only the obligatory ingredients a), b) and c) but also from 0.1 to 30% by weight of one or more surfactants d) from the group of alkyl polyglycosides (as described in more detail below), fatty alcohol polyglycol ethers (as described in more detail below), and styrylphenol polyglycol ethers (as known, for instance, from the above-mentioned EP-A-735 109).

Alkyl polyglycosides can be characterized by the general structure (IV):

$$R\text{—}(G)_p \qquad (IV)$$

In this formula, R denotes a linear, saturated alkyl radical having 8 to 22 carbon atoms and $(G)_p$ denotes a glycoside or oligoglycoside radical having a degree of oligomerization, p, of from 1 to 10. Alkyl glycosides of the stated formula (IV) are long-established surface-active substances which can be prepared from sugars and from aliphatic, primary alcohols having 8 to 22 carbon atoms by acetalization. Suitable sugar components (glycoses) are preferably glucose, but also fructose, mannose, galactose, telose, gulose, allose, altrose, idose, arabinose, xylose, lyxose, libose and mixtures thereof. Preferred on account of their ready availability and good performance properties are the acetalization products of glucose with fatty alcohols, which are obtainable, for example, from natural fats and oils by known processes, especially those with linear, primary, saturated and unsaturated fatty alcohols having 8 to 22 carbon atoms. In respect of the glycoside radical $(G)_p$, both monoglycosides (p=1), in which one sugar residue is linked glycosidically to the fatty alcohol, and oligomeric glycosides, having a degree of oligomerization p=2 to 10, are suitable. In general, mixtures of mono- and oligoglycosides are present. Preferred and suitable alkyl glycosides (IV) are those in which R is an alkyl group having 8 to 22 carbon atoms and $(G)_p$ is a glycoside or oligoglycoside radical having a degree of oligomerization p=1 to 10. With very particular preference, R is an alkyl group having 8 to 14 carbon atoms. The average degree of oligomerization is preferably in the range from 1 to 1.5.

Fatty alcohol polyglycol ethers can be characterized by the general formula (V):

$$R^9\text{—}O\text{—}(CH_2\text{—}CHR^{10}\text{—}O)_q H \qquad (V)$$

In this formula, $R^9$ is a linear, saturated alkyl radical having 8 to 22 carbon atoms, the radical $R^{10}$ is hydrogen or a methyl group, and the index q is a number in the range from 1 to 50. Among the group of the compounds (V), particular preference is given to fatty alcohol ethoxylates, especially adducts of from 2 to 20 mol of ethylene oxide per mole of fatty alcohol having 12 to 18 carbon atoms.

In another embodiment the pigment concentrates of the invention contain not only the obligatory ingredients a), b) and c) but also from 0.1 to 30% by weight of one or more coadditives e) from the group of polyethylene glycols and polyglycol ethers (obtainable by ethoxylating 1,2- or 1,3-propanediol, 1,2-1,4-butanediol, hexanediol, glycerol, trimethylolpropane or pentaerythritol), which compounds should have a molecular weight in the range from 200 to 1000, preferably from 200 to 600.

In addition to said obligatory ingredients a), b) and c) the pigment concentrates of the invention may additionally comprise further constituents which are customary in pigment concentrates. Examples of such constituents are defoamers, preservatives, drying retardants, and antisettling agents.

The pigment concentrates of the invention are suited to the coloring of paints by, for example, the home improver or by the skilled worker in paint banks, or else at the premises of the paints manufacturer. However, the pigment concentrates of the invention may likewise be used for coloring other coatings, such as printing inks, leather dressings, wallpaper colors, wood varnishes, wood preservative systems and woodstains, overprint varnishes, or air-drying or oven-drying industrial coatings, and for pigmenting colored pencil leads, fiber tip pens, inkjet inks, graphics inks, pastes for ballpoint pens, shoe polishes, nonwoven webs, colored paper coating slips and paper pulp colorings, printing inks for cardboard, spin-dyeing colorants, and films.

The examples which follow serve to illustrate the invention and should not be understood as limitative.

EXAMPLES

1. Substances Used 1.1. Pigments

PR 101: Pigment with Colour Index PR (Pigment Red) 101; "Bayferrox 120 M" (from Bayer) was used for this PV 19: Pigment with Colour Index PV (Pigment Violet) 19; "Hostaperm rotviolett ER 02" (from Hoechst AG) was used for this PG 7: Pigment with Colour Index PG (Pigment Green) 7; "Sunfast grün 7 264–0414" (from Sun Chemicals) was used for this PBk 7: Pigment with Colour Index PR (Pigment Black) 7; "Spezialschwarz 4" (from Degussa) was used for this 1.2. Antisettling Agent Xanthan gum "Deuteron VT 819" (Wilhelm O. C. Schöner GmbH, Achim)

1.3. Defoamer

Silicone defoamer "Dehydran 3282" (Henkel KGaA, Düsseldorf)

1.4. Additives of the Invention

Add-1: Compound of the general formula (I) where $R^1$ is a linear $C_{10/12}$ alkyl radical, the radicals $R^2$ and $R^6$ are hydrogen, and the sum (x+y) is 10.

1.5. White Emulsion Paints and Dispersion Lacquers

Disp-1: Emulsion paint based on vinyl acetate-ethylene copolymer ("Vinnapast EZ 36", Wacker Chemie)

Disp-2: Emulsion paint based on styrene acrylate ("Acronal 290D", BASF)

Disp-3: Dispersion lacquer based on all-acrylate ("Neocryl XK90", Zeneca Resins/NL)

2. Preparation of the Pigment Pastes (pigment concentrates)

2.1. Example B-1

34.9 parts by weight of water were introduced as an initial charge, 4.5 parts by weight of the additive Add-1 were added with stirring, and this mixture was homogenized. Then 60 parts by weight of the pigment PR 101 were added and the mixture was homogenized using a dissolver (Dispermat CV, from Getzmann, Reinhardshagen). Dimethylethanolamine was added carefully to the premix obtained in this way, in an amount such as to give a pH of 8. Subsequently, 0.4 part by weight of the defoamer specified under 1.3. and 0.2 part by weight of the antisettling agent specified under 1.2. were added and the mixture was dispersed using a stirred ball mill in a circulation process (Dispermat SL, from Getzmann, Reinhardshagen) for 30 minutes at a speed of 2000 revolutions per minute.

2.2. Example B-2

57.6 parts by weight of water were introduced as an initial charge, 12 parts by weight of the additive Add-1 were added with stirring, and this mixture was homogenized. Then 30 parts by weight of the pigment PV 19 were added and the mixture was homogenized using a dissolver (Dispermat CV, from Getzmann, Reinhardshagen). Dimethylethanolamine was added carefully to the premix obtained in this way, in an amount such as to give a pH of 8. Subsequently, 0.4 part by weight of the defoamer specified under 1.3. was added and the mixture was dispersed using a stirred ball mill in a circulation process (Dispermat SL, from Getzmann, Reinhardshagen) for 60 minutes at a speed of 3500 revolutions per minute.

2.3. Example B-3

48.6 parts by weight of water were introduced as an initial charge, 11 parts by weight of the additive Add-1 were added with stirring, and this mixture was homogenized. Then 40 parts by weight of the pigment PG 7 were added and the mixture was homogenized using a dissolver (Dispermat CV, from Getzmann, Reinhardshagen). Dimethylethanolamine was added carefully to the premix obtained in this way, in an amount such as to give a pH of 8. Subsequently, 0.4 part by weight of the defoamer specified under 1.3. was added and the mixture was dispersed using a stirred ball mill in a circulation process (Dispermat SL, from Getzmann, Reinhardshagen) for 60 minutes at a speed of 4000 revolutions per minute.

2.4. Example B-4

59.6 parts by weight of water were introduced as an initial charge, 15 parts by weight of the additive Add-1 were added with stirring, and this mixture was homogenized. Then 25 parts by weight of the pigment PBk 7 were added and the mixture was homogenized using a dissolver (Dispermat CV, from Getzmann, Reinhardshagen). Dimethylethanolamine was added carefully to the premix obtained in this way, in an amount such as to give a pH of 8. Subsequently, 0.4 part by weight of the defoamer specified under 1.3. was added and the mixture was dispersed using a stirred ball mill in a circulation process (Dispermat SL, from Getzmann, Reinhardshagen) for 90 minutes at a speed of 4000 revolutions per minute.

3. Performance Investigations

The pigment pastes obtained according to 2.1. to 2.4. (Examples B-1 to B-4) were tested for their viscosity behavior and for their compatibility with white emulsion paints and dispersion lacquers. The results can be found from Tables 1 to 3.

3.1. Viscosity Behavior

The viscosities of the pigment pastes of Examples B-1 to B-4 were measured a) after storage at 20° C. for 24 hours, and b) after storage at 40° C. for 4 weeks, at room temperature by the Brookfield method (LVT, 30 revolutions per minute, spindle 2–4, after stirring time of 1 minute); the figures in Table 1 are in mPas.

TABLE 1

| Viscosity behavior | | | | |
| --- | --- | --- | --- | --- |
|  | B-1 | B-2 | B-3 | B-4 |
| Viscosity after 24 hrs | 500 | 3500 | 300 | 150 |
| Viscosity after 4 weeks | 540 | 3200 | 320 | 160 |

3.2. Rubout

To determine the rubout, the white emulsion paints and lacquers Disp-1 to Disp-3 were each admixed with 10% by weight—based on the white emulsion paint or dispersion lacquer employed—of the pigment pastes according to Examples B-1 to B-4 and the mixtures were homogenized. The resulting formulations were then applied a) immediately, and b) after storage at 40° C. for 4 weeeks in a thin film (150 micrometers' wet-film thickness) to paper contrast charts (from Erichsen, Type "7.32/7"). After about 3 minutes, the applied mixture was rubbed with the finger in the lower third of the test chart and then the colors of the unrubbed area were compared with the color of the rubbed area (using Dr. Lange MicroColor in accordance with CIELAB, illuminant D65, 10°). The resulting ΔE values are reported in Tables 2a (formulations used directly) and 2b (formulations stored for 4 weeks). As the skilled worker is aware, in the technical sector at issue here, ΔE values in the region of from 0.3 to 0.5 are classified as very good, ΔE values in the region of from 0.5 to about 1.0 are classified as good, and ΔE values of more than 1.0 are classified as unacceptable.

TABLE 2a

| Rubout on direct use of the formulations | | | | |
| --- | --- | --- | --- | --- |
|  | B-1 | B-2 | B-3 | B-4 |
| Disp-1 | 0.6 | 0.4 | 0.5 | 0.5 |
| Disp-2 | 0.5 | 0.3 | 0.5 | 0.4 |
| Disp-3 | 0.6 | 0.4 | 0.3 | 0.3 |

TABLE 2b

| Rubout on 4-week storage of the formuiations | | | | |
| --- | --- | --- | --- | --- |
|  | B-1 | B-2 | B-3 | B-4 |
| Disp-1 | 0.6 | 0.5 | 0.6 | 0.6 |
| Disp-2 | 0.5 | 0.3 | 0.5 | 0.4 |
| Disp-3 | 0.5 | 0.4 | 0.3 | 0.4 |

3.3. Degree of Gloss

To determine the degree of gloss, the white emulsion paints and lacquers Disp-1 to Disp-3 were each admixed with 10% by weight—based on the white emulsion paint or dispersion lacquer employed—of the pigment pastes according to Examples B-1 to B-4 and the mixtures were homogenized. The resulting formulations were then applied a) immediately, and b) after storage at 40° C. for 4 weeks in a thin film (150 micrometers' wet-film thickness) to paper contrast charts (from Erichsen, Type "7.32/7"). After drying, the degree of gloss was determined at angles of 85° or 60° using a Dr. Lange degree of gloss measuring instrument. The results are reported in Tables 3a (formulations used directly) and 3b (formulations stored for 4 weeks) For comparison, the degree of gloss of the white emulsion paints and dispersion lacquers was also determined, i.e., of the unmodified polymer dispersions Disp-1 to Disp-3 not tinted with the pigment pastes B-1 to B-4 of the invention. These reference values are entered for purposes of comparison in Tables 3a and 3b in the column headed "reference".

TABLE 3a

Degree of gloss on direct use of the formulations

| | Measurement angle | Reference | B-1 | B-2 | B-3 | B-4 |
|---|---|---|---|---|---|---|
| Disp-1 | 85° | 3 | 3 | 3 | 3 | 3 |
| Disp-2 | 85° | 5 | 5 | 5 | 5 | 5 |
| Disp-3 | 60° | 44 | 43 | 45 | 46 | 44 |

TABLE 3b

Degree of gloss on 4-week storage of the formulations

| | Measurement angle | Reference | B-1 | B-2 | B-3 | B-4 |
|---|---|---|---|---|---|---|
| Disp-1 | 85° | 3 | 3 | 3 | 3 | 3 |
| Disp-2 | 85° | 5 | 5 | 5 | 5 | 5 |
| Disp-3 | 60° | 45 | 44 | 44 | 45 | 45 |

What is claimed is:

1. A method of preparing a pigment concentrate, said method comprising:

(a) providing at least one diol alkoxylate selected from the general formulae (I), (II) and (III);

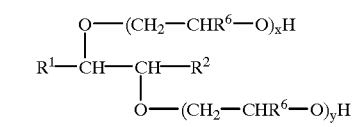

(I)

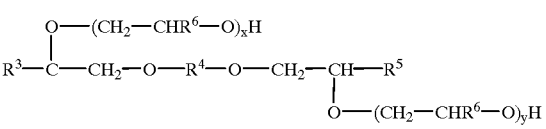

(II)

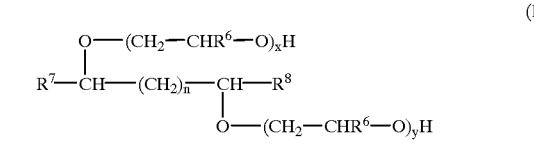

(III)

(b) combining the at least one diol alkoxylate with a pigment and a liquid carrier medium; and (c) mixing the at least one diol alkoxylate, the pigment and the liquid carrier medium to form a pigment concentrate;

wherein each of $R^1$, $R^2$, $R^3$, $R^5$, $R^7$ and $R^8$ independently represents a hydrogen atom or an alkyl group having from 1 to about 36 carbon atoms, with the proviso that both $R^1$ and $R^2$ are not simultaneously hydrogen atoms and the total number of carbon atoms in $R^1$ and $R^2$ is from about 6 to about 38, and with the proviso that both $R^3$ and $R^5$ are not simultaneously hydrogen atoms and the total number of carbon atoms in $R^3$ and $R^5$ is from about 6 to about 38, wherein $R^4$ represents a linear or branched alkylene group having from about 2 to about 12 carbon atoms or $(-CH_2-CHR^6-O)_z$, wherein $R^6$ represents a hydrogen atom or a methyl group, wherein each of x and y independently represent a number of from about 1 to about 200, z represents a number of from about 1 to about 20, n represents a number of from about 2 to about 12, and wherein the sum of x+y is a number of from about 5 to about 200.

2. The method according to claim 1, wherein each of $R^1$, $R^2$, $R^3$ and $R^5$ independently represents an alkyl group having from about 12 to about 18 carbon atoms, and wherein the sum of x+y is a number of from about 5 to about 120.

3. The method according to claim 1, wherein the at least one diol alkoxylate is represented by the general formula (1), wherein $R^1$ represents a linear alkyl radical having from about 10 to about 12 carbon atoms, each of $R^2$ and $R^6$ is a hydrogen atom, and wherein the sum of x+y is about 10.

4. The method according to claim 1, wherein the at least one diol alkoxylate is present in an amount of from about 0.1 to about 20% by weight, based on the total weight of the pigment concentrate.

5. The method according to claim 2, wherein the at least one diol alkoxylate is present in an amount of from about 0.1 to about 20% by weight, based on the total weight of the pigment concentrate.

6. The method according to claim 3, wherein the at least one diol alkoxylate is present in an amount of from about 0.1 to about 20% by weight, based on the total weight of the pigment concentrate.

7. The method according to claim 1, wherein the liquid carrier medium comprises water.

8. The method according to claim 4, wherein the liquid carrier medium comprises water.

9. A pigment concentrate comprising a pigment, a liquid carrier medium and at least one diol alkoxylate of the general formulae (I), (II) and (III):

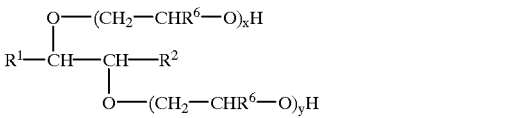

(I)

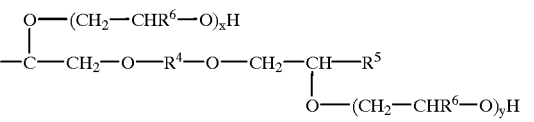

(II)

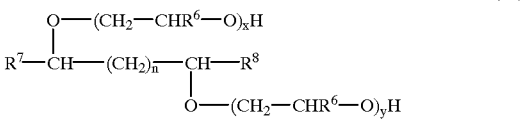

(III)

wherein each of $R^1$, $R^2$, $R^3$, $R^5$, $R^7$ and $R^8$ independently represents a hydrogen atom or an alkyl group having from 1 to about 36 carbon atoms, with the proviso that both $R^1$ and $R^2$ are not simultaneously hydrogen atoms and the total number of carbon atoms in $R^1$ and $R^2$ is from about 6 to about 38, and with the proviso that both $R^3$ and $R^5$ are not simultaneously hydrogen atoms and the total number of carbon atoms in $R^3$ and $R^5$ is from about 6 to about 38, wherein $R^4$ represents a linear or branched alkylene group having from about 2 to about 12 carbon atoms or $(-CH_2-CHR^6-O)_z$, wherein $R^6$ represents a hydrogen atom or a methyl group, wherein each of x and y independently represent a number of from about 1 to about 200, z represents a number of from about 1 to about 20, n represents a number of from about 2 to about 12, and wherein the sum of x+y is a number of from about 5 to about 200.

10. The pigment concentrate according to claim 9, wherein each of $R^1$, $R^2$, $R^3$ and $R^5$ independently represents an alkyl group having from about 12 to about 18 carbon atoms, and wherein the sum of x+y is a number of from about 5 to about 120.

11. The pigment concentrate according to claim 9, wherein the at least one diol alkoxylate is represented by the general formula (I), wherein $R^1$ represents a linear alkyl radical having from about 10 to about 12 carbon atoms, each of $R^2$ and $R^6$ is a hydrogen atom, and wherein the sum of x+y is about 10.

12. The pigment concentrate according to claim 9, wherein the pigment is present in an amount of from about 10 to about 80% by weight, the liquid carrier medium is present in an amount of from about 15 to about 85% by weight, and the at least one diol alkoxylate is present in an amount of from about 0.1 to about 20% by weight, all percent weights being based on the total weight of the pigment concentrate.

13. The pigment concentrate according to claim 10, wherein the pigment is present in an amount of from about 10 to about 80% by weight, the liquid carrier medium is present in an amount of from about 15 to about 85% by weight, and the at least one diol alkoxylate is present in an amount of from about 0.1 to about 20% by weight, all percent weights being based on the total weight of the pigment concentrate.

14. The pigment concentrate according to claim 9, wherein the pigment is present in an amount of from about 25 to about 60% by weight, the liquid carrier medium is present in an amount of from about 30 to about 60% by weight, and the at least one diol alkoxylate is present in an amount of from about 4 to about 15% by weight, all percent weights being based on the total weight of the pigment concentrate.

15. The pigment concentrate according to claim 10, wherein the pigment is present in an amount of from about 25 to about 60% by weight, the liquid carrier medium is present in an amount of from about 30 to about 60% by weight, and the at least one diol alkoxylate is present in an amount of from about 4 to about 15% by weight, all percent weights being based on the total weight of the pigment concentrate.

16. The pigment concentrate according to claim 9, wherein the liquid carrier medium comprises water.

17. The pigment concentrate according to claim 9, further comprising at least one surfactant selected from the group consisting of alkylpolyglycosides, fatty alcohol polyglycol ethers, and styrylphenol polyglycol ethers.

18. The pigment concentrate according to claim 17, wherein the at least one surfactant is present in an amount of from about 0.1 to about 30% by weight, based on the total weight of the pigment concentrate.

19. The pigment concentrate according to claim 9, further comprising at least one coadditive selected from the group consisting of polyethylene glycols and polyglycol ethers.

20. The pigment concentrate according to claim 17, wherein the at least one coadditive is present in an amount of from about 0.1 to about 30% by weight, based on the total weight of the pigment concentrate.

* * * * *